United States Patent [19]

Price

[11] 4,296,810
[45] Oct. 27, 1981

[54] METHOD OF PRODUCING OIL FROM A FORMATION FLUID CONTAINING BOTH OIL AND WATER

[76] Inventor: Ernest H. Price, 1266 Pepper Dr., El Centro, Calif. 99243

[21] Appl. No.: 174,350

[22] Filed: Aug. 1, 1980

[51] Int. Cl.³ .................. E21B 43/02; E21B 43/38
[52] U.S. Cl. .............................. 166/265; 166/106; 166/228; 166/305 D; 210/500.2; 210/497.1
[58] Field of Search ............... 166/265, 305 D, 314, 166/68, 105, 228, 106; 210/650-654, 500.2, 497.1, 494.2

[56] References Cited

U.S. PATENT DOCUMENTS

| | | | |
|---|---|---|---|
| 2,281,801 | 5/1942 | Reynolds et al. | 166/306 |
| 2,523,091 | 9/1950 | Bruce | 166/265 X |
| 2,692,051 | 10/1954 | Webb . | |
| 2,946,387 | 7/1960 | Hooker, Jr. | 166/105 |
| 3,066,732 | 12/1962 | McEver | 166/266 |
| 3,167,125 | 1/1965 | Bryan | 166/305 D |
| 3,195,633 | 7/1965 | Jacob | 166/305 D |
| 3,375,666 | 4/1968 | Sutton | 166/305 D |
| 4,014,387 | 3/1977 | Fink | 166/314 |

Primary Examiner—Stephen J. Novosad
Attorney, Agent, or Firm—Dennis T. Griggs

[57] ABSTRACT

Method for producing oil from a subsurface formation containing both oil and water is disclosed. The oil and water are separated downhole within the well with the separated water being conveyed through a well bore and discharged into a disposal formation without raising it to the surface of the well, unless the pressure in the dispersal formation is excessive. The oil is separately conveyed through the well bore to the surface. Separation of the oil and water is carried out be a separator assembly which includes an outer shell having an upper end fitted for connection to a pump intake, a lower end having perforations for admitting formation fluid, a centrally disposed collector tube extending through the shell and dividing the shell into a central flow passage and an annular flow passage, and a laminated filter element disposed in the annular flow passage and convolutely wound around the collector tube. The filter element includes first and second semipermeable membrane sheets which are wettable only to water, a porous substrate sheet interleaved between the first and second semipermeable membrane sheets, and a perforated spacer element interleaved between the adjacent semipermeable layers and wound in convolute relation therewith. Formation fluid is pumped through the space provided by the spacing element with the water phase permeate being collected and conveyed through the collector tube and the remaining crude oil phase fluid being conveyed through the spaces between the semipermeable layers.

6 Claims, 11 Drawing Figures

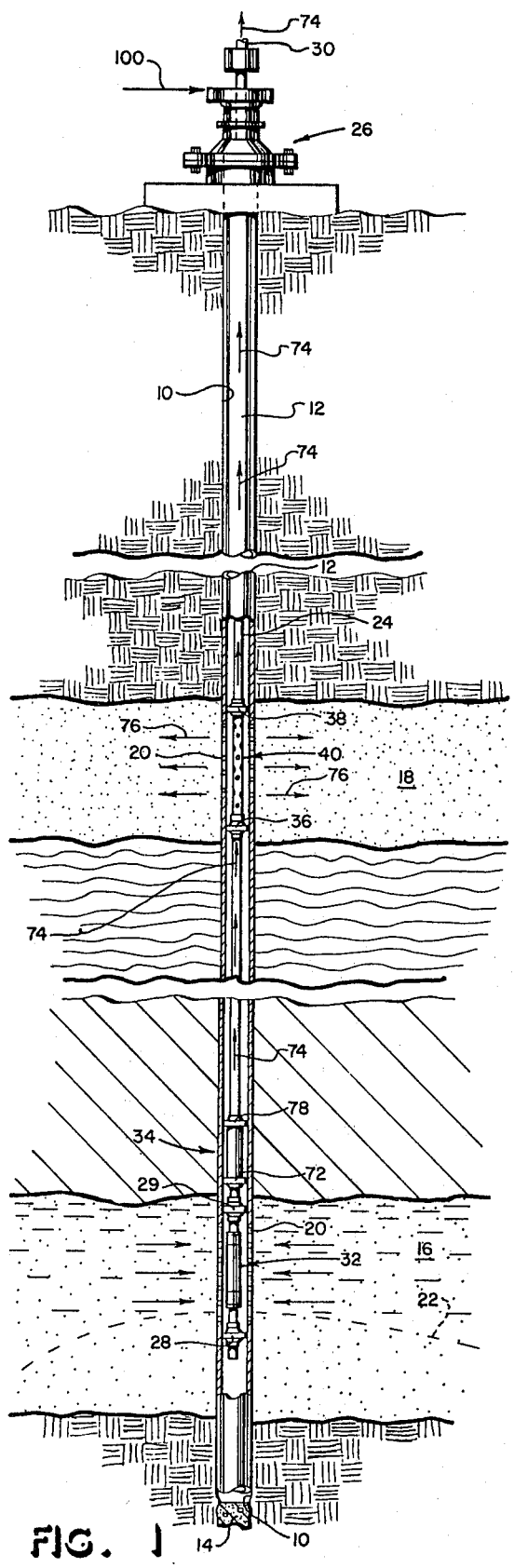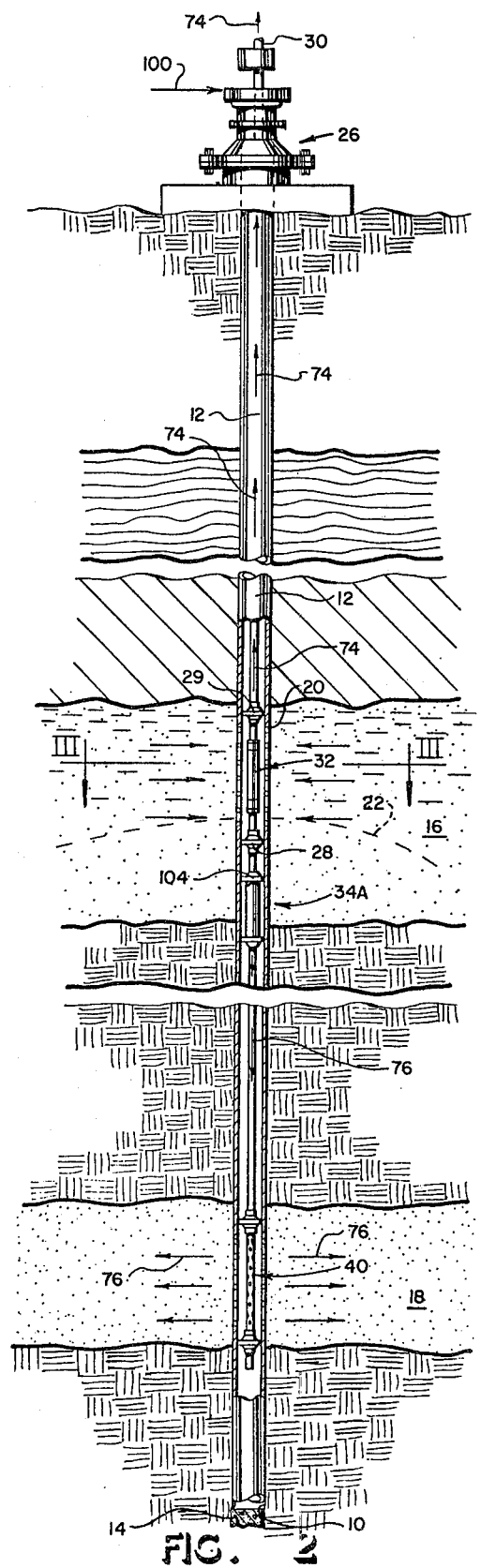

METHOD OF PRODUCING OIL FROM A FORMATION FLUID CONTAINING BOTH OIL AND WATER

BACKGROUND OF THE INVENTION

1. Field of the Invention

This invention relates generally to oil well production and, in particular, to a method for separating oil and water below the surface of the ground so that only oil is produced at the surface with the water being separately conveyed through the well bore and discharged into a disposal formation without raising it to the surface of the well.

2. Description of the Prior Art

Oil and/or gas wells quite often pass through productive strata whose yield, besides including oil, gas and other valuable products, also includes undesirable and unwanted heavy precipitates such as salt water. In oil well production operations, relatively large quantities of water are frequently produced along with the valuable products. This is particularly true during the latter stages of the producing life of a well. Handling this water represents a significant expense in lifting, separation and disposal.

Various methods have been employed for extracting the valuable yield from the heavier and unwanted precipitates such as salt water. Some have involved the pumping of the total yield to the surface of the well and then using various methods for separating the valuable yield from the unwanted portion of the yield. In addition, the unwanted portion of the yield, after having been pumped to the top of the well and separated, has been pumped downwardly again through a remote well bore into a disposal stratum.

In some oil wells the unwanted heavier precipitate can amount to as much as eighty percent to ninety percent of the total yield and, accordingly, in order to obtain a given volume of valuable yield from the well, eight or nine times the volume of the valuable yield must first be pumped to the surface of the well and then the valuable yield must be separated from the unwanted portion of the yield. As previously set forth, this process can be very slow and expensive. Although the problem of producing waterfree oil from a reservoir may occur at any stage in the life of an oil well, the proportion of water to valuable yield generally increases with time as the oil reserves decline. Ultimately, when the lifting costs of the combined oil and water exceed the value of the recovered oil, abandonment becomes the only reasonable alternative. As production nears this stage, the local area of the oil field is considered as being exhausted and the well is referred to as being a "stripper".

Many procedures have been tried for producing waterfree oil from a formation which includes a large quantity of water. For example, the oil and water produced are pumped or otherwise flowed together to the surface where they are treated to separate the oil from the water. Since the volume of the water is usually much greater than that of the oil, the separator must handle large volumes of water and, therefore, must be large and, accordingly, relatively expensive. Moreover, the water produced contains mineral salts which are extremely corrosive, particularly in the presence of air. Also, flowing of the oil and water together upwardly through the well sometimes results in emulsions forming which are difficult to break. Such emulsions frequently must be heated in order to separate them even in the presence of emulsion treating chemicals. The heating of the large amount of water, as well as the small amount of oil, requires an expenditure of large amounts of energy to reduce the net equivalent BTU production from the well.

Water produced from deep formations within the earth frequently contains large amounts of natural salts. For this reason, the produced salt water cannot be disposed of by allowing it to flow into surface drains or waterways. Relatively small volumes of salt water can sometimes be disposed of by drainage into a slush pit or evaporation tank. However, the required disposal method for large volumes of salt water is to introduce the water into a subsurface formation where no damage can result. This requires that a disposal well be provided for receiving the produced salt water. By returning the water to the same formation in this manner, the water is disposed of and also acts more or less as a repressurizing medium to aid in maintaining the bottom hole pressure and in driving the well fluids toward the producing well. In those areas where producing wells are widely separated, the cost of drilling disposal wells for each producing well is prohibitive. In such instances, it is necessary to lay a costly pipeline gathering network to bring all of the produced water to a central location, or alternatively, to transport the produced water by trucks or similar vehicles. Regardless of the method for transporting the waste salt water from the producing well to the disposal well, the cost of the disposal can be, and usually is, prohibitive.

OBJECTS OF THE INVENTION

The principal object of the present invention is the provision of a method for separating oil and water within a well bore for producing waterfree oil at the surface while injecting the water into a disposal stratum, thus eliminating lifting and surface handling of the water.

Another object of the invention is to provide a well pumping method in which the pressure in the producing formation or formations is maintained by the downhole separation of the water and oil with return of the separated water into the producing formation through the same well bore at a lower elevation.

Yet another object of the present invention is to provide a method of returning water to a well formation simultaneously with the removal of the well fluids from the formation, whereby an offset well is not necessary to conduct the water to the formation and also whereby the production of the well fluids may continue without interruption during the return of such water.

A particular object of the invention is to provide an improved method wherein water and oil are separated in a well bore, after which the oil is lifted to the surface while the water is returned to the same reservoir or to a disposal reservoir, through the same well bore, whereby production of the oil may continue during the return or disposal of the water.

Still another object of the invention is to provide an improved separator which will effectively separate water from oil in a well bore, whereby the water need not be lifted to the surface to be separated.

Yet another object of the invention is to provide an improved method for simultaneously lifting oil to the surface and returning water to a producing reservoir or to a disposal reservoir through the same well bore which includes packing off the bore below the producing strata and conducting the water to the reservoir or to the disposal reservoir below the packing, whereby the returned water does not interfere with normal production of well fluids from the producing zone.

A further object of the invention is to provide an improved method for simultaneously lifting oil from a producing reservoir to the surface and returning water to a disposal zone above the reservoir through the same well bore, which includes packing off the bore above the producing strata and conducting water to the disposal zone above the packing whereby the return water does not interfere with normal production of well fluids from the producing reservoir.

A further object of the invention is to carry out the disposal of waste salt water produced in a well bore with a minimum of expenditure of power and without returning the waste salt water to the surface.

SUMMARY OF THE INVENTION

According to novel features of the method of the present invention, the foregoing objects are achieved by a separator for separating oil and water downhole within the well in combination with first and second pumps for discharging the separated water into a disposal formation without raising it to the surface of the well, while pumping the oil separately through the well bore to the surface. Separation of the oil and water is carried out by a separator assembly which includes an outer shell having an upper end fitted for connection to a pump intake, a lower end having perforations for admitting formation fluid, a centrally disposed collector tube extending through the shell and dividing the shell into a central flow passage and an annular flow passage, and a laminated filter element disposed in the annular flow passage and convolutely wound around the collector tube. The filter element includes first and second semipermeable membrane sheets which are wettable only to water, a porous substrate sheet interleaved between the first and second semipermeable membrane sheets, and a perforated spacer element interleaved between the adjacent semipermeable layers and wound in convolute relation therewith. Formation fluid is pumped axially through the space provided by the spacing element with the salt water permeate being collected and conveyed through the collector tube and the remaining crude oil being conveyed to the surface through the spaces intermediate the semipermeable layers.

The foregoing and other related objects and advantages of the present invention will become more apparent from the following specification, claims and appended drawings wherein:

DESCRIPTION OF THE DRAWINGS

FIG. 1 is a vertical, sectional view of a well bore extending through a production zone and a disposal zone located above the production zone with the separator and pump assembly arranged for lifting separated oil to the surface and discharging the separated water into the disposal zone in accordance with the method of the invention.

FIG. 2 is a view similar to FIG. 1 in which the relative positions of the disposal zone and production zone are reversed, with separated oil being lifted to the surface and separated water being discharged to the disposal zone below.

DESCRIPTION OF THE PREFERRED EMBODIMENT

Figure 3:
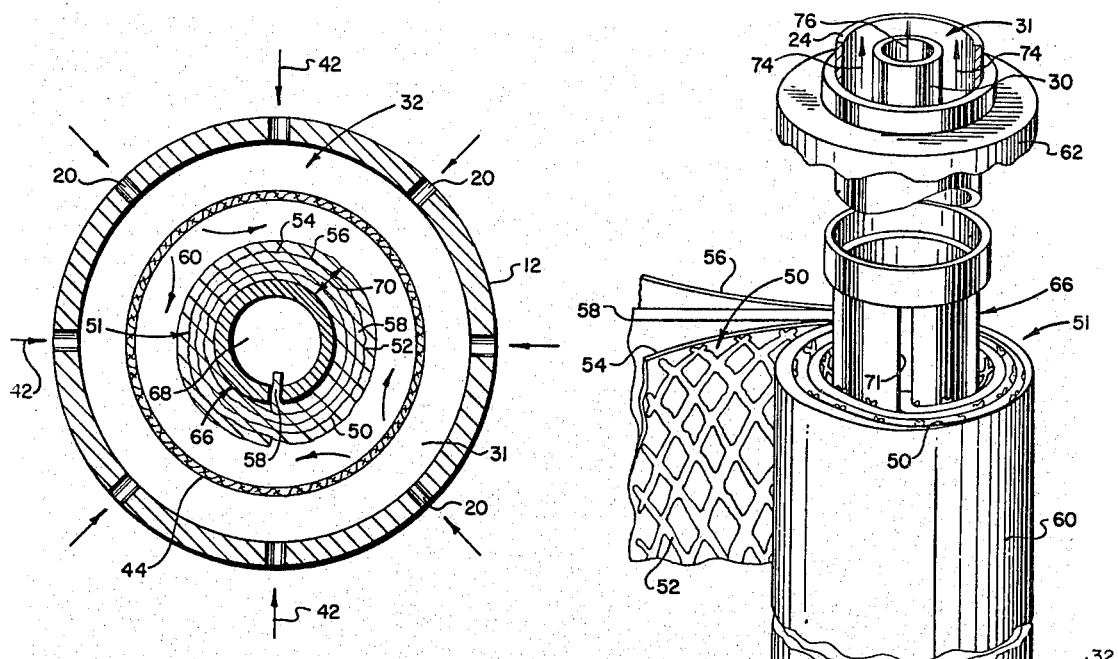
FIG. 3 is a sectional view of the separator taken along the line III—III of FIG. 2.
Figure 4:
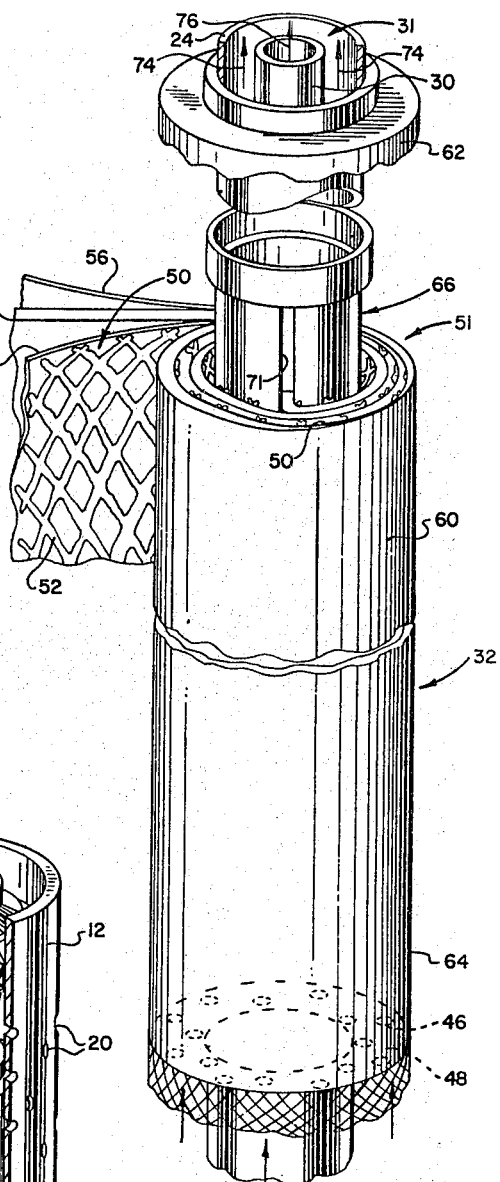
FIG. 4 is a perspective view, partly broken away, for use in the method of the present invention.
Figure 6:
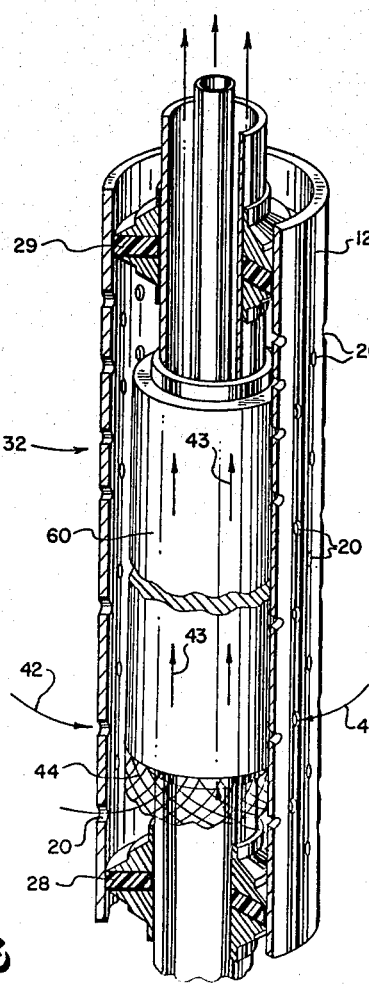
FIG. 6 is a perspective view of the separator assembly enclosed within a perforated section of well bore casing.
Figure 5:
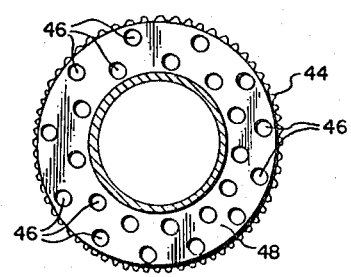
FIG. 5 is a bottom view of the separator shown in FIG. 4.

In the description which follows, like parts are marked throughout the specification and drawings with the same reference numerals, respectively. The figures are not necessarily drawn to scale and, in some instances, portions have been exaggerated in order to more clearly depict certain features of the invention.

Referring now to FIG. 1 of the drawings, a plurality of earth formations are traversed by a well bore (10) which is drilled by conventional techniques. The well bore is fitted with a production casing (12) which is cemented in place at the bottom of the bore by a cement plug (14). After the casing (12) has been cemented in place, it is perforated at two levels, one level of perforations being in a known production zone (16) and the other layer of perforations being in a known disposal zone (18). The locations of the disposal zone (18) and production zone (16) are determined by any of the known methods of well logging. Perforations (20) are formed in the casing by conventional perforation techniques. The perforations (20) in the production zone permit production fluids to enter the interior of the casing (12), and the perforations (20) in the disposal zone permit water separated from the production fluid according to the teachings of the present invention to be discharged laterally into the disposal zone (18).

Prior to the drilling of the bore hole (10) into the production zone (16), there is a more or less well defined normal static interface (22) between the oil and salt water in the porous reservoir formation (16), since these liquids have been segregated by gravity into their respective zones due to their different specific gravities. The perforations (20) are preferably made in the casing slightly above the actual oil/water interface. During the initial production stage, the depth of the production zone (16) may range from as little as one foot to one thousand feet or more. This layer could lie from a hundred feet to more than ten thousand feet below the earth's surface. Continued production of oil from this well gradually reduces the thickness of the oil layer and permits the oil/water interface (18) to gradually rise. It can rise to its maximum level, known as its "potential free water level" (PFWL). The position of the PFWL relative to the oil/water interface (22) can be determined by conventional techniques, such as by measuring the thickness of the producing formation (16) and multiplying it by the specific gravity of the oil. The perforations (20) are preferably formed in the casing (10) at an elevation equal to or slightly above the elevation of the PFWL.

In completing the well according to the present invention, a production string (24) extends from a surface well head (26) to a conventional production packer (28) which closes off the annulus between the production casing and the production string (24). A production packer (29) also anchors the production tubing in the well. Concentrically received within the production string (24) is a tubing string (30) which defines a production channel through which separated crude oil is lifted to the well head (26), with the annulus between the central tubing string (30) and production string (24) defining a separate channel (31) through which salt water is conveyed to the disposal zone (18).

Figure 7:
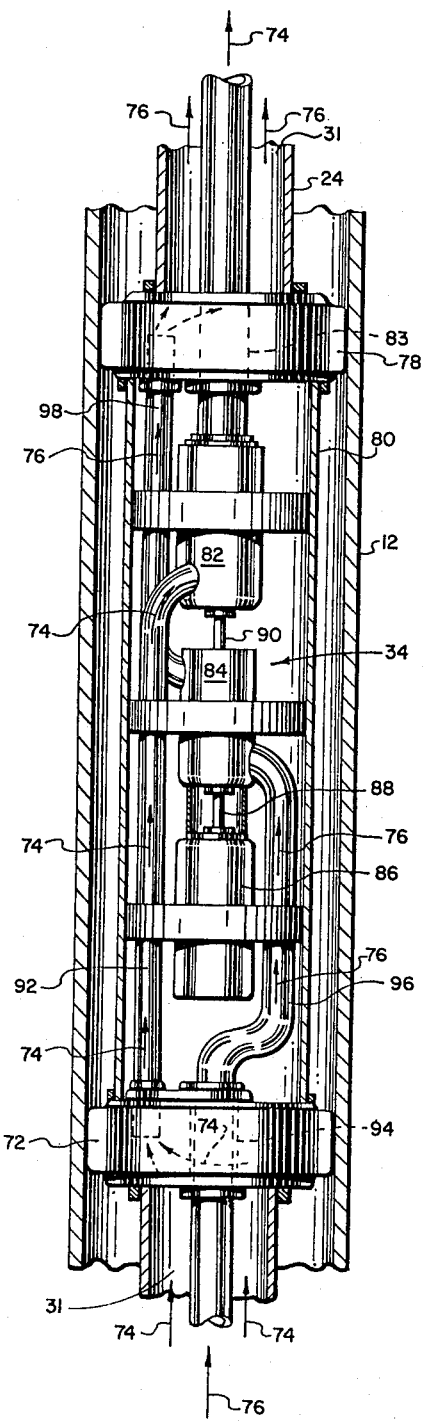
FIG. 7 is an elevation view, partly in section, of the pump assembly shown in FIG. 1.

According to the invention in its broadest aspects, formation fluid from the production zone (16), including both oil and water, enters the production casing (12) through the perforations (20) and is conveyed under pressure through a filter or separator assembly (32) where the oil and water are separated and fed into separate pumps of a pump assembly (34) as can best be seen in FIG. 7 of the drawing. After the production fluid is separated into its oil phase and water phase by the separator assembly (32), the oil phase of the formation fluid is lifted through the central tubing string (30) to the well head (26) where it is stored in a holding tank (not shown) for trans-shipment to a refinery. The separated water, on the other hand, is discharged through the annulus (31) intermediate the production string (24) and the central tubing string (30) and is lifted upwardly for discharge into the disposal zone (18). The annulus between the production casing (12) and the production string (24) is sealed off by packers (36, 38) near the lower and upper boundaries of the disposal zone (18), and the production string (24) is provided with a perforated section (40) through which the salt water flows as it is pumped into the disposal zone (18). According to this arrangement, crude oil is produced and delivered at the well head (26) simultaneously with the separation and discharge of salt water into the disposal zone (18). The salt water may be delivered to the surface for disposal if the pressure of the subsurface disposal formation is too high.

Referring now to FIGS. 3-6, the separator assembly (32) is supported in concentric relation within the perforated section of the production casing (12) by means of the packers (28, 29). Production fluid, including both oil and water, enters the perforations (20) as indicated by the arrows (42) and is drawn upwardly through the separator assembly (32) as indicated by the arrows (43) in response to the downhole pressure associated with the production zone (16) and in response to the suction developed by the pump assembly (34).

Referring now to FIG. 3, formation fluid (42) entering the annulus between the production casing (12) and the production string (24) is prefiltered by a wire screen (44), for example 100 mesh, which serves as a coarse filter for preventing the entry of sand and small bits of rock which are usually found in such formation fluid. After negotiating the screen (44), the production fluid passes through perforations (46) formed in a bottom plate (48) of the filter assembly. In response to the suction and pressure, the formation fluid is directed axially through the spiral space (50) in a laminated filter element (51) formed by a perforated spacer element (52) which is wound in convolute relation along with dual semipermeable membranes (54, 56) which are disposed in interleaved relation with a porous substrate (58).

The separator assembly (32) includes an outer shell (60) having an upper end (62) fitted for connection to a pump intake, a lower end (64) supporting the perforated bottom plate (48) admitting formation fluid, and a centrally disposed collector tube (66) extending through the shell (60) and dividing the shell into a central flow passage (68) and an annular flow passage (70). The laminated filter element (51) is convolutely wound around the collector tube (66) and is disposed within the annular flow passage (70). After entering the perforations (46) of the bottom plate (48), the formation fluid is pumped axially into the spiral space (50) provided by the spacing element (52) with the salt water permeate flowing radially through the interleaved semipermeable membranes (54, 56) and also spiralling through the porous substrate (58) through a slot (71) in the collector tube (66) at the center.

The semipermeable membranes (54, 56) preferably comprise a membrane material that is extremely hydrophilic, that is, one that has a very strong affinity for water. Such materials remain wetted even in the presence of hydrophobic particles, so that the particles cannot adhere to the surface by excluding water. A preferred hydrophilic polymer is a sulfonate polymer, that is, a polymer bearing on its surface the sulfonate group, $SO_3$. This membrane is preferably formed by casting a membrane of styrene-based polymer with sulfonate groups exposed at the membrane surface and within the pores of the membrane to form a thin film of the sulfonate polymer on its surface, then adding a chemical agent that creates cross links among the resulting long chain molecules.

For production fluid comprising an oil and water emulsion (water is the continuous phase), assuming a 100 psi driving pressure at 100° F., it has been determined that from fifty to one hundred gallons of water per square foot of separator assembly can be removed in each 24-hour operating period. The spiral module configuration (51) described above, having a two-inch diameter and being twelve inches long, has an effective filter area of five square feet. Assuming a ratio of water to oil of approximately ten to one, the corresponding crude oil separation would be five to ten gallons of crude per square foot per day, or twenty five to fifty gallons of crude per day for each foot in length of a two-inch diameter filter element (51).

As the differential pressure across the filter element (51) increases, the flux, that is the amount of salt water permeate, increases, but the concentration polarization effect also increases, that is, the collection of droplets at the membrane interface would increase. This can be alleviated by stirring the formation fluids as they enter on the high pressure side of the filter assembly.

As the production fluid traverses the filter element (51), salt water permeate is rapidly conveyed radially toward the collector tube (66) as the formation fluid advances along the length of the assembly. Because the semipermeable membranes are wettable only by water, the crude oil remains trapped in the spiral space intermediate the semipermeable membranes (54, 56) and is thereby prevented from entering the collector tube (66).

Referring now to FIG. 7, the crude oil is conveyed through the annulus (31) between the production string (24) and the central tubing string into a suction header and connector assembly (72) which forms the lower end of the pump assembly (34). The flow of crude is represented by the arrow (74), and the flow of salt water is indicated by the arrow (76). The pump assembly (34) comprises an upper suction header (78) and a cylindrical housing (80) mounted between the upper and lower suction headers. Enclosed within the pump assembly housing (80) are a crude oil pump (82), a brine pump (84) and an electric drive motor (86). The crude oil pump (82) and brine pump (84) are mounted in tandem for receiving a common rotary driving force from the electric motor (86). The electric motor (86) is mechanically coupled to the brine pump (84) by means of a shaft (90). It should be understood that the arrangement shown in FIG. 7 is a more or less idealized representation of commercially available electrical submersible pumps. After flowing through the annulus (31), the crude is evacuated from the lower suction header (72) and is conveyed through pump inlet tubing (92) to the crude oil pump (82). It is discharged from the pump (82) through a feed-through tube (83) which forms a separate path for the crude through the suction header (78). The salt water (76), on the other hand, is separately conveyed through the suction header and connector (72) by means of a feed-through tube assembly (94) and is connected to a pump inlet tube (96) which forms the inlet of the brine pump (84). The output of the brine pump (84) is conveyed through a discharge tube (98) which forms an input to the upper suction header (78). In response to pressure developed by the brine pump (84), the salt water flow (76) is directed through the annulus (31) between the production string (24) and the central tubing string (30) and is lifted upwardly for discharge into the disposal zone (18) through the perforated section (40) of the production string (24).

A common power channel (not shown) is brought down from an electrical power connection (100) at the well head (26) to the electric drive motor (86) in the usual manner. Although an electrical submersible pump arrangement is preferred, any of various suitable types of pumps may be used to good advantage. For example, the pumps (82, 84) may be reciprocating plunger pumps, in which case the common power channel and power input means would be suitably connected reciprocating pump rods. Additionally, the pumps may be hydraulic pumps, in which case the common power channel and power input means would be suitably connected hydraulic power tubing. The pumps may also be turbine pumps with the power input means being an elongated shaft rotated by an external prime mover, in which case the common power channel would be a rotatable shaft connecting the two turbine pumps. As illustrated, however, the pumps (82, 84) are turbine pumps driven by an adjoining submersible electrical motor (86), in which case the common power channel and power input is an electrical power cable (not shown).

It should be evident that the invention may be carried out by using two different types of pumps, with different appropriate power channels for each of them. Or, the pumps (82, 84) may be of like kind, but which are powered through separate power channels. However, it is usually preferable to select the pumps according to their expected fluid flow output relative to each other so they can share a common power channel and power input means.

Figure 8:
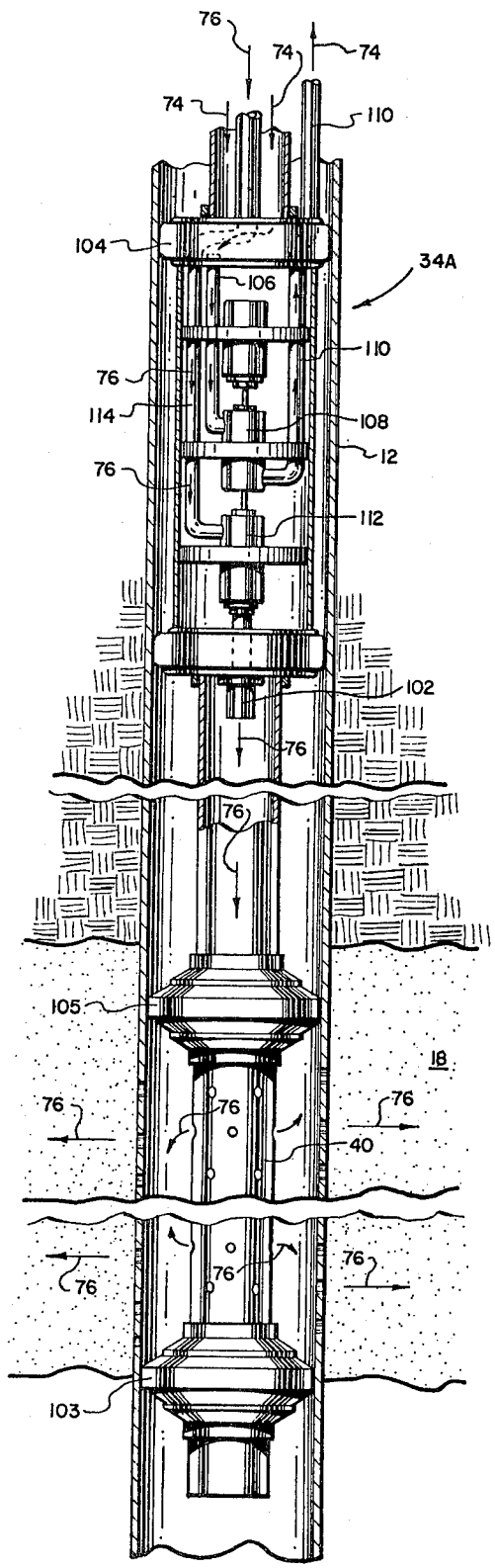
FIG. 8 is an elevation view, partly in section, of the pump assembly shown in FIG. 2.

Referring now to FIGS. 2 and 8, a separator assembly (32) and pump assembly (34A) for separately conveying oil to the surface and salt water to a lower disposal zone are illustrated. In this arrangement, the filter assembly (32) is packed off by the packing elements (28, 29) in a perforated section of the well casing for receiving formation fluids from the production zone (16). After being separated in the filter assembly (32) as previously discussed, salt water (76) is pumped through a discharge tube (102) and is discharged under pressure through a perforated section (40) into the disposal zone (18) which lies at a relatively lower elevation with respect to the production zone (16). The perforated section is isolated by the packing elements (103, 105). In this arrangement, crude oil (74) is accumulated in an upper suction header (104) and is conveyed through a pump inlet tube (106) to a crude pump (108). The crude oil is discharged from the pump under pressure through a crude return line (110) to a point above the filter assembly where it is manifolded in communication with the central tubing string (30) for delivery of the crude to the well head (26). With this exception, operation of the assembly in FIG. 8 is essentially the same as that in FIG. 7. That is, a brine pump (112) coupled to the salt water discharge line (114) from the filter assembly is driven in common by means of an electrical drive motor (116). The pump assembly (34A) is similarly housed with the motor and pumps suitably supported between the suction headers and cylindrical housing.

Figure 9:
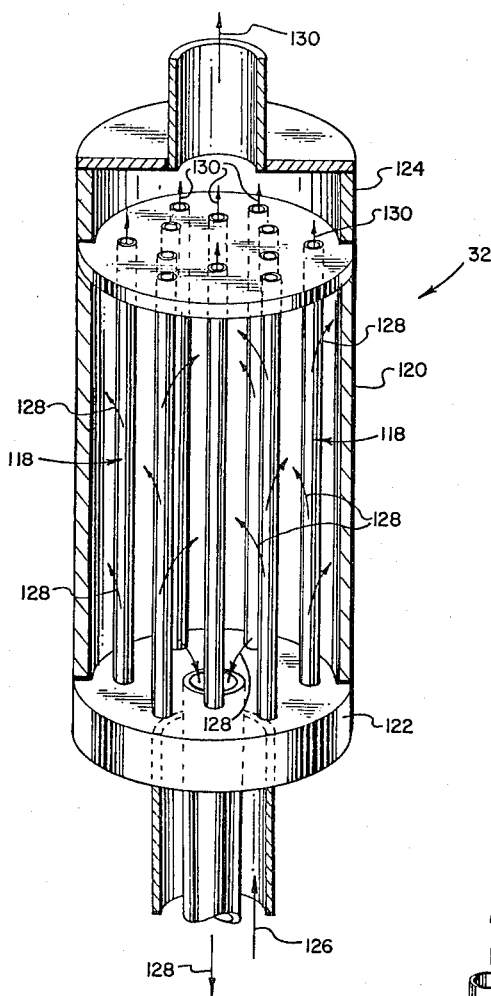
FIG. 9 is a perspective view of an alternate form of separator assembly for use in the method of the invention.
Figure 10:
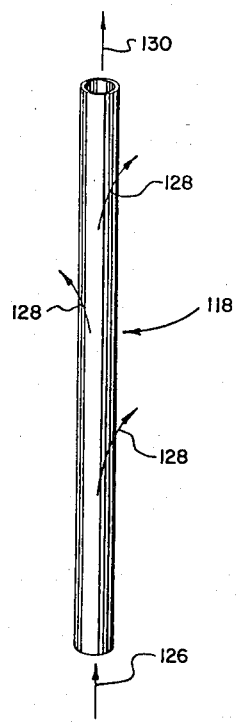
FIG. 10 is a perspective view of a separator element for the separator assembly shown in FIG. 9.

An alternate embodiment for the separator assembly (32) is illustrated in FIGS. 9 and 10. According to this arrangement, the separator comprises an array of elongated separator elements (118) which are elongated tubes having a sidewall formed of semipermeable membrane material that is permeable only to water. The separator elements (118) are preferably constructed of a hydrophilic polymer such as sulfonate polymer. The tubes are preferably formed by extruding a styrene-based polymer with sulfonate groups exposed at the membrane surface and within the pores of the membrane to form a tube having a thin film of the sulfonate polymer on its outer surfaces, and then adding a chemical agent that creates cross-lengths among the resulting long chain molecules.

The separator assembly (32) shown in FIG. 9 comprises a cylinder (120) which encloses an array of the elongated separator tubes (118) which are extended through the cylinder from a lower header chamber (122) to an upper discharge chamber (124). Formation fluid comprising a water and oil mixture enters the lower chamber (122) as indicated by the arrow (126) from which it is withdrawn and forced through the tubular separator elements (118). As the water and oil mixture (126) flows through the separator elements, the water permeate flows radially through the side wall of the separator elements as indicated by the arrows (128). Because the walls of the separator elements are permeable only to water, the oil phase continues through the separator tubes as indicated by the arrow (130) and are discharged into the upper header chamber (124). Because the efficiency of this arrangement is proportional to the pressure differential across the separator elements, the water and oil mixture (126) is preferably pumped under pressure into the lower header chamber, and the oil phase permeate (130) is preferably withdrawn from the upper header chamber (124) by means of a separate pump assembly.

Figure 11:
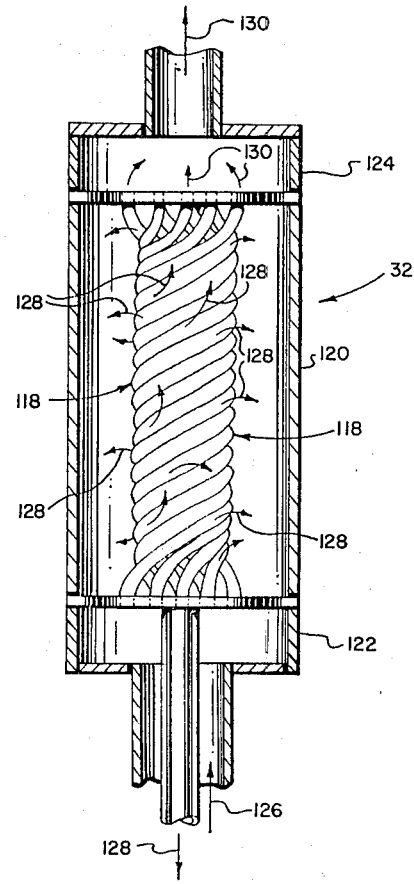
FIG. 11 is an elevation view, partly in section, of a preferred spiral configuration for the separator assembly of FIG. 9.

Although the tubular separator elements (118) are shown in a vertical, parallel array, the separation efficiency can be increased by arranging the tubes to follow a spiral path from the lower header chamber to the upper header chamber, which allows a longer separator length relative to a give cylinder length. Furthermore, since the water phase of the mixture has a higher specific gravity, it is forced radially outwardly in response to the centrifugal forces developed as the water and oil mixture (126) traverses the spiral path through each tube as shown in FIG. 11.

It will be apparent that the invention may be embodied in other specific forms without departing from the spirit or essential characteristics thereof. Thus, the present embodiment should be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A method of producing oil from a formation fluid containing both oil and water comprising the steps of:
   providing a production casing in a well bore traversing both a production zone and a disposal zone located at vertically spaced apart levels with respective sets of perforations connecting the interior of the production casing with the two said zones;
   drawing formation fluid from the production zone through said perforations into a separator assembly disposed within said casing in the region of the production zone, causing the formation fluid to pass in contact with a surface of filter medium of the separator assembly, which filter medium is permeable to one component of the formation fluid;
   maintaining a pressure gradient across said filter medium; and
   pumping the separated oil from one side of the filter medium to the surface and pumping the separated water from the other side of the filter medium through the production casing to said disposal region and discharging said water at said disposal level.

2. A method of producing oil from a formation fluid containing both oil and water comprising the steps of:
   providing a production casing in a well bore traversing both a production zone and a disposal zone located at vertically spaced apart levels with respective sets of perforations connecting the interior of the production casing with the two said zones;
   drawing formation fluid from the production zone through said perforations into a separator assembly disposed within said casing in the region of the production zone;
   effecting radial separation of the oil and water within the separator assembly;
   delivering the oil to an oil pump and pumping it therefrom to the surface;
   delivering the water to a water pump and pumping it therefrom to the disposal zone and discharging it from the production casing at that level.

3. A method for producing oil from a formation fluid containing both oil and water which comprises admitting the formation fluid into a well, driving the formation fluid under pressure through an enclosed collection zone with the formation fluid being exposed to one surface of a semipermeable membrane which is wettable only by water, separately conveying the water which permeates the membrane to a disposal formation, and separately conveying the oil phase of the production fluid to the surface.

4. A method of producing oil from a formation fluid containing both oil and water comprising the steps of:
   providing a production casing in a well bore traversing both a production zone and a disposal zone located at vertically spaced apart levels with respective sets of perforations connecting the interior of the production casing with the two said zones;
   drawing formation fluid from the production zone through said perforations into a separator assembly disposed within said casing in the region of the production zone;
   filtering said oil and water mixture to effect separation of the oil and water within said separator assembly;
   delivering the oil to an oil pump and pumping it therefrom to the surface;
   delivering the water to a water pump and pumping it therefrom to the disposal zone and discharging it from the production casing at that level.

5. The method according to claim 4, including the steps of causing the mixture of oil and water to flow axially through a filter element, which is wound in a spiral about a central tube and which communicates with said central tube, whereby the water flows radially inwardly through said filter element into said central tube.

6. The method according to claim 4, including the steps of supplying the oil and water mixture to a header which communicates with the hollow interior of a plurality of filter tubes, which are permeable to water and impermeable to oil, introducing the mixture into the interior of said tubes under pressure; collecting the water which passes radially outwardly through the walls of the tube for delivery to said water pump and collecting the oil which passes axially through the interior of the tubes for delivery to said oil pump.

* * * * *